(12) United States Patent
Seok

(10) Patent No.: US 9,204,480 B2
(45) Date of Patent: *Dec. 1, 2015

(54) DIRECT LINK SETUP METHOD IN TUNNELED DIRECT LINK SETUP WIRELESS NETWORK AND STATION SUPPORTING THE METHOD

(71) Applicant: LG Electronics Inc., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,810

(22) Filed: Aug. 29, 2014

(65) Prior Publication Data

US 2014/0369304 A1 Dec. 18, 2014

Related U.S. Application Data

(63) Continuation of application No. 14/043,697, filed on Oct. 1, 2013, now Pat. No. 8,855,092, which is a continuation of application No. 12/433,475, filed on Apr. 30, 2009, now Pat. No. 8,565,199.

(60) Provisional application No. 61/095,609, filed on Sep. 9, 2008, provisional application No. 61/049,476, filed on May 1, 2008.

(51) Int. Cl.
*H04W 76/02* (2009.01)
*H04W 28/16* (2009.01)

(52) U.S. Cl.
CPC ............ *H04W 76/023* (2013.01); *H04W 28/16* (2013.01)

(58) Field of Classification Search
CPC .................................................. H04W 76/023
USPC .................. 370/282, 329, 338, 347, 349, 350
See application file for complete search history.

(56) References Cited

U.S. PATENT DOCUMENTS

| 7,251,235 B2 | 7/2007 | Wentink |
| 7,869,809 B2 | 1/2011 | Qi et al. |

(Continued)

FOREIGN PATENT DOCUMENTS

| JP | 2007-060029 A | 3/2007 |
| KR | 10-2006-0099473 A | 9/2006 |

(Continued)

OTHER PUBLICATIONS

Choi et al., "Half Direct-Link Setup (H-DLS) for Fairness between External and Local TCP Connections in IEEE 802.11e Wireless LANs," Proc. of IEEE ICC 2007, Jun. 24, 2007, pp. 4500-4505.

(Continued)

*Primary Examiner* — Brian D Nguyen
*Assistant Examiner* — Toan Nguyen
(74) *Attorney, Agent, or Firm* — Birch, Stewart, Kolasch & Birch, LLP

(57) ABSTRACT

A Tunneled Direct Link Setup (TDLS) establishment method. The method includes associating a Basic Service Set (BSS) which includes an Access Point (AP); transmitting a TDLS setup request frame through the AP to an intended peer station, the TDLS setup request frame requesting to establish a TDLS direct link, the TDLS setup request frame including a link identifier, the link identifier including a BSSID field, a transmitter address field and a receiver address field, the BSSID field being set to a BSSID, the transmitter address field being set to a medium access control (MAC) address of the TDLS initiator, the receiver address field being set to a MAC address of the intended peer station; receiving a TDLS setup response frame including a status code field; and transmitting a TDLS setup confirm frame including the link identifier. The TDLS setup confirm frame includes high throughput operation information.

8 Claims, 12 Drawing Sheets

(56) References Cited

U.S. PATENT DOCUMENTS

| | | | |
|---|---|---|---|
| 8,374,123 | B2 | 2/2013 | Wentink |
| 2004/0246934 | A1 | 12/2004 | Kim |
| 2005/0036469 | A1 | 2/2005 | Wentink |
| 2005/0053015 | A1 | 3/2005 | Jin et al. |
| 2005/0130634 | A1 | 6/2005 | Godfrey |
| 2005/0135305 | A1 | 6/2005 | Wentink |
| 2005/0136921 | A1* | 6/2005 | Stephens ............... 455/434 |
| 2006/0165035 | A1 | 7/2006 | Chandra |
| 2006/0221879 | A1 | 10/2006 | Nakajima et al. |
| 2006/0248429 | A1 | 11/2006 | Grandhi et al. |
| 2006/0268816 | A1* | 11/2006 | Adachi et al. ............ 370/347 |
| 2007/0002782 | A1* | 1/2007 | Kneckt et al. ........... 370/282 |
| 2007/0104137 | A1 | 5/2007 | Tang |
| 2007/0140197 | A1* | 6/2007 | Sawada ............... 370/338 |
| 2007/0171858 | A1 | 7/2007 | Grandhi et al. |
| 2007/0189168 | A1 | 8/2007 | Yao |
| 2007/0280180 | A1 | 12/2007 | Dalmases et al. |
| 2008/0031209 | A1 | 2/2008 | Abhishek et al. |
| 2008/0069047 | A1 | 3/2008 | Yee et al. |
| 2008/0225756 | A1 | 9/2008 | Amann et al. |
| 2008/0304444 | A1 | 12/2008 | Soomro |
| 2009/0231995 | A1 | 9/2009 | Chu et al. |

FOREIGN PATENT DOCUMENTS

| | | |
|---|---|---|
| WO | 02/091623 A1 | 11/2002 |
| WO | WO 2005/067535 A2 | 7/2005 |
| WO | WO 2006/099025 A2 | 9/2006 |
| WO | WO 2007/055993 A1 | 5/2007 |
| WO | WO 2007/067000 A1 | 6/2007 |

OTHER PUBLICATIONS

IEEE Standard for I.T.—Telecommunications and information exchange between systems—Local and metropolitan area networks . . . , Part 11: Wireless LAN . . . (MAC) and . . . (PHY) specifications, Amendment 8: Medium Access Control (MAC) Quality of Service Enhancements, Nov. 11, 2005, pp. 1-189.

Wentink et al., "New DLS (nDLS)," IEEE 802.11-07/0478r0, 2007 (Slide Presentation dated Mar. 15, 2007), 12 pages.

IEEE, "IEEE P802.11e/D13.0 Part 11: Wireless Lan Medium Access control (MAC) and Physical Layer (PHY) Specifications: Amendment: Medium Acces Control (MAC) Quality of Service (QoS) Enhancments", Jan. 2005, 30 pages, XP002426608.

Yoon et al., "iDLS: Inter-BSS Direct Link Setup in IEEE 802.11 WLANs", Communications and Information Technologies, ISCIT International Symposium, IEEE, PI, Oct. 1, 2007, pp. 1015-1020, XP031166610.

* cited by examiner

FIG. 2

| TDLS Type Value | Meaning |
| --- | --- |
| 0 | TDLS Setup Request |
| 1 | TDLS Setup Response |
| 2 | TDLS Setup Confirm |
| 3 | TDLS Teardown Request |
| 4 | TDLS Teardown Response |
| 5 | TDLS Tx Path Switch Request |
| 6 | TDLS Tx Path Switch Responce |
| 7 | TDLS Rx Path Switch Request |
| 8 | TDLS Rx Path Switch Responce |
| 9 | Peer Traffic Indication |
| 9-255 | Reserved |

FIG. 6

| Order | Information |
|---|---|
| 1 | Link Identifier |
| 2 | Association Request frame body |
| 3 | Dialog Token |
| 4 | RSNIE_I |
| 5 | SMK Message 1 FTIE |
| 6 | DH_I |

FIG. 7

| Transmitter Address | Receiver Address | BSSID | SSID | DLS Timeout |
|---|---|---|---|---|

FIG. 8

| Order | Information |
|---|---|
| 1 | Link Identifier |
| 2 | Status Code |
| 3 | Association Request frame body |
| 4 | Dialog Token |
| 5 | RSNIE_P |
| 6 | SMK Message 2 FTIE |
| 7 | DH_P |

DIRECT LINK SETUP METHOD IN TUNNELED DIRECT LINK SETUP WIRELESS NETWORK AND STATION SUPPORTING THE METHOD

CROSS-REFERENCE TO RELATED APPLICATIONS

This application is a continuation of U.S. patent application Ser. No. 14/043,697 filed on Oct. 1, 2013 (now U.S. Pat No. 8,855,092), which is a continuation U.S. patent application Ser. No. 12/433,475 filed on Apr. 30, 2009 (now U.S. Pat. No. 8,565,199), which claims priority under 35 U.S.C. §119 (e) to U.S. Provisional Application No. 61/049,476 filed on May 1, 2008 and U.S. Provisional No. 61/095,609 filed on Sep. 9, 2008. The contents of all of these applications are hereby incorporated by reference as fully set forth herein in their entirety.

BACKGROUND OF THE INVENTION

1. Field of the Invention

The present invention relates to a wireless local access network (WLAN), and more particularly, to a direct link setup procedure in a tunneled direct link setup (TDLS) wireless network and a station supporting the direct link setup procedure.

2. Discussion of the Related Art

With the development of information communication technology, a variety of wireless communication technology has been developed. A wireless LAN (WLAN) is a technique permitting wireless access to its local network or Internet in specific service areas such as home or companies or air planes by the use of portable terminals such as a personal digital assistant (PDA), a laptop computer, and a portable multimedia player (PMP) on the basis of the radio communication technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz. In recent years, with the development of the wireless communication technology, 54 Mbps in maximum can be supported by applying the Orthogonal Frequency Division Multiplex (OFDM) technology, etc. to the WLAN. In addition, the IEEE 802.11 has developed or is developing wireless communication technologies for improvement in quality of service (QoS), compatibility of an access point (AP) protocol, security enhancement, wireless resource measurement, wireless access in vehicular environment, fast roaming, mesh network, inter-working with external networks, wireless network management, and the like.

In the IEEE 802.11, a Basic Service Set (BSS) means a set of stations (STAs) successfully synchronized. A Basic Service Area (BSA) means an area including members of the BSS. The BSA can vary depending on propagation characteristics of a wireless medium and thus it may contain members of other basic service sets.

The BSS can be basically classified into two kinds of an independent BSS (IBSS) and an infra-structured BSS. The former means a BSS that constitutes a self-contained network and that is not permitted to access a Distribution System (DS). The latter means a BSS that includes one or more Access Points (APs) and a distribution system and that uses the APs in all the communication processes including communications between the Non-AP stations.

In the initial WLAN communication procedure, it was required that data is necessarily transmitted through the AP in the infra-structured BSS. That is, the direct transmission of data between non-AP stations (non-AP STAs) is not allowed in the infra-structured BSS. In recent years, a direct link setup (DLS) between the non-AP STAs supporting Quality of Service (QoS) has been introduced to improve the efficiency of wireless communications. Accordingly, in the BSS supporting the QoS, that is, in the QBSS including QoS STAs (QSTA) and QoS APs (QAP), the non-AP STAs can set up a direct link therebetween and directly communicate with each other through the direct link.

As described above, the existing DLS setup method is based on the premise that the BSS is the QBSS, which is a BSS supporting the QoS. In the QBSS, the AP as well as the non-AP STA is a QAP, which is an AP supporting the QoS. In the most WLAN environments currently used (for example, WLAN environments in accordance with the IEEE 802.11a/b/g), the non-AP STAs are QSTAs supporting the QoS but the APs are legacy APs not supporting the QoS. As a result, in the WLAN environments currently used, there exists a limitation that even a QSTA cannot utilize the DLS service.

A TDLS (Tunneled Direct Link Setup) is a wireless communication protocol newly suggested to overcome such a limitation regarding the existing DLS service. The TDLS allows the QSTAs to set up a direct link in the currently used WLAN environments in accordance with the IEEE 802.11a/b/g. Accordingly, the TDLS defines methods of allowing the QSTAs to set up a direct link even in the BSS managed by the legacy AP. Hereinafter, a wireless network supporting the TDLS method is referred to as a TDLS wireless network.

In the TDLS wireless network, it is first necessary to specifically define a method of setting up a direct link between two non-AP QSTAs. Particularly, in the TDLS wireless network, an AP does not support the direct link setup method and thus does not directly participate in the setup method of the direct link. Accordingly, there is a need for efficiently and reliably enabling the direct link setup method.

And, in the communication between non-AP QSTAs through the direct link set up, it is necessary to allow the QoS facilities of the non-AP QSTAs to work properly. In addition, when the non-AP QSTAs support High Throughput (HT) capabilities of IEEE 802.11n, it is preferable to allow the HT facilities of the non-AP QSTAs to work properly.

SUMMARY OF THE INVENTION

The embodiment of the present invention provides a direct link setup method in a TDLS wireless network with high reliability and a station supporting the direct setup method.

The embodiment of the present invention provides a direct link setup method in a TDLS wireless network that can allow two non-AP QSTAs intending to set up a direct link therebetween to be consistent in completion of the direct link setup and a station supporting the direct setup method.

The embodiment of the present invention provides a direct link setup method in a TDLS wireless network that can allow the QoS capabilities and/or the HT capabilities to properly operate in a communication between non-AP QSTAs having set up a direct link therebetween and a station supporting the direct setup method.

According to an aspect of the present invention, there is provided a Tunneled Direct Link Setup (TDLS) establishment method for a TDLS initiator, the method comprising: transmitting a TDLS setup request frame via an access point (AP) to an intended peer station; receiving a TDLS setup response frame via the AP from the intended peer station in response to the TDLS setup request frame; transmitting a TDLS setup confirm frame via the AP to the intended peer station in response to the TDLS setup response frame; and receiving a TDLS setup acknowledgement frame from the intended peer station in response to the TDLS setup confirm frame.

Wherein the TDLS setup acknowledgement frame may be received from the intended peer station via the AP.

Wherein the TDLS setup confirm frame may include an EDCA (Enhanced Distributed Channel Access) parameter set information element.

Wherein both the TDLS setup request frame and the TDLS setup response frame may include QoS capability information element.

Wherein the TDLS setup confirm frame may include an HT(High Throughput) operation information element.

Wherein both the TDLS setup request frame and the TDLS setup response frame may include an HT capability information element.

Wherein the HT operation information element may include a secondary channel offset element.

Wherein the TDLS initiator and the intended peer station may be associated with the same AP.

Wherein the TDLS setup response frame may contain a status code field set to a value indicating 'successful'.

According to another aspect of the present invention, there is provided a method for establishing a direct link in Tunneled Direct Link Setup (TDLS) wireless network, the method is characterized in that: first station which initiates establishment procedure of the direct link receives a TDLS setup acknowledge frame from second station in response to a TDLS setup confirm frame transmitted to the second station via an access point(AP) from the first station, wherein the TDLS setup confirm frame includes an EDCA (Enhanced Distributed Channel Access) parameter set information element and the TDLS setup confirm frame is transmitted in response to a TDLS setup response frame that received to the first station from the second station.

Wherein the EDCA parameter set information element may contain QoS Parameters which are used on the primary channel and/or on the secondary channel.

According to still another aspect of the present invention, there is provided a method for establishing a direct link in Tunneled Direct Link Setup (TDLS) wireless network, the method is characterized in that: first station which initiates establishment method of the direct link transmits a TDLS setup confirm frame in response to the TDLS setup response frame received from second station via an access point(AP) to the second station, and the TDLS setup response frame is transmitted by the second station to the first station in response to the TDLS setup request frame, and the TDLS setup confirm frame includes an HT (High Throughput) operation information element.

Wherein the HT operation information element may contain secondary channel offset element.

According to still another aspect of the present invention, there is provided a Tunneled Direct Link Setup (TDLS) establishment method for an intended peer station of a TDLS initiator, the method comprising: receiving a TDLS setup request frame via an access point(AP) from the TDLS initiator; transmitting a TDLS setup response frame via the AP to the TDLS initiator in response to the TDLS setup request frame; receiving a TDLS setup confirm frame via the AP from the TDLS initiator in response to the TDLS setup response frame; and transmitting a TDLS setup acknowledgement frame via the AP to the TDLS initiator in response to the TDLS setup confirm frame.

Wherein the TDLS setup confirm frame may include an EDCA (Enhanced Distributed Channel Access) parameter set information element, and Wherein the EDCA parameter set information element may contain QoS Parameters which are used on the primary channel and/or on the secondary channel.

Wherein the TDLS initiator and the intended peer station may be associated with the same AP.

Wherein the TDLS setup confirm frame may include HT(High Throughput) Operation information element, and the HT operation information element may contain secondary channel offset element.

Wherein a status code field set to a value indicating 'successful' included in the TDLS setup response frame if the intended peer station accept the direct link.

According to still another aspect of the present invention, there is provided a station for supporting Tunneled Direct Link Setup (TDLS) in a wireless local access network, the station comprising: a processor configured to generate and process frames; and a transceiver operably connected to the processor and configured to transmit and receive the frames for the processor, wherein the station is configured to transmit a TDLS setup request frame via an access point(AP) to an intended peer station, to receive a TDLS setup response frame via the AP from the intended peer station in response to the TDLS setup request frame, to transmit a TDLS setup confirm frame via the AP to the intended peer station in response to the TDLS setup response frame; and to receive a TDLS setup acknowledge frame via the AP from the intended peer station in response to the TDLS setup confirm frame.

Wherein the TDLS setup confirm frame may include an EDCA (Enhanced Distributed Channel Access) parameter set information element and/or HT (high Throughput) operation information element.

According to still another aspect of the present invention, there is provided a station for supporting Tunneled Direct Link Setup (TDLS) in a wireless local access network, the station comprising: a processor configured to generate and process frames; and a transceiver operably connected to the processor and configured to transmit and receive the frames for the processor, wherein the station is configured to receive a TDLS setup request frame via an access point (AP) from a TDLS initiator, to transmit a TDLS setup response frame via the AP to the TDLS initiator in response to the TDLS setup request frame, to receive a TDLS setup confirm frame via the AP from the TDLS initiator in response to the TDLS setup response frame; and to transmit a TDLS setup acknowledgement frame via the AP to the TDLS initiator in response to the TDLS setup confirm frame.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a diagram illustrating types of the TDLS frame and values corresponding thereto.

FIG. 6 is a diagram illustrating information included in an information field of the TDLS setup request frame.

FIG. 7 is a block diagram illustrating a format of a link identifier field included in the TDLS setup request frame.

FIG. 8 is a diagram illustrating information included in an information field of a TDLS setup response frame.

DETAILED DESCRIPTION OF THE INVENTION

Figure 1:
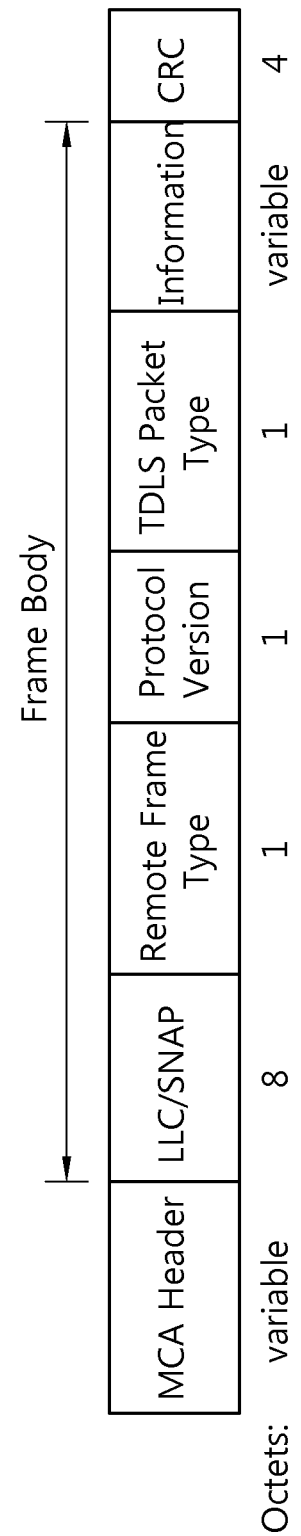
FIG. 1 is a diagram illustrating a format of a TDLS frame.

Hereinafter, exemplary embodiments of the invention will be described in detail with reference to the accompanying drawings.

In a TDLS wireless network to which embodiments of the invention can be applied, non-AP QSTAs (hereinafter, simply referred to as "QSTA") associated with a legacy AP not supporting the QoS can set up a direct link therebetween and can tear down the direct link. One QSTA should be able to transmit and receive management action frames for setting up and tearing down a direct link through the legacy AP to set up a direct link with another QSTA or to tear down a direct link with a peer QSTA. However, there is a problem in that the legacy AP cannot support the procedure for setting up or tearing down the direct link between two QSTAs in accordance with an existing DLS procedure of IEEE 802.11e.

One method for solving such a problem is to encapsulate the management action frames regarding the direct link setup/teardown procedure in the form of a data frame and to transmit the encapsulated management action frames to the peer QSTA. According to this method, the legacy AP performs only a function of relaying the management action frames, as if it relay a data frame between two non-AP QSTAs. As a result, the legacy AP does not participate in the procedures of setting up, managing, and tearing down a TDLS link. The embodiments of the invention to be described later can be usefully applied to a TDLS wireless network in which the management action frames for setting up, tearing down, and managing the TDLS link are encapsulated in the form of a data frame and are transmitted through an AP. Here, the AP is not limited to the legacy AP, but may be a QAP supporting the DLS.

Among the devices constituting a TDLS wireless network system, a non-AP STA is a device including a physical layer interface for a wireless medium and a medium access control (MAC) in accordance with the standard of IEEE 802.11. The non-AP STA may be called a wireless transmission/reception unit (WTRU), a user equipment (UE), a mobile station (MS), or a mobile subscriber unit. A non-AP STA supporting the quality of service (QoS) is simply referred to as a non-AP QSTA or QSTA.

The non-AP STA includes a processor and a transceiver and may further include a user interface and a display. The processor is a functional unit designed to generate frames to be transmitted through a wireless network or to process frames received through the wireless network, and performs a variety of functions of controlling the corresponding station and processing signals input by and for a user. The transceiver is functionally connected to the processor and is a unit designed to transmit and receive frames through the wireless network.

The AP is a functional entity having a wireless station function and providing access to a distribution system via a wireless medium for an associated non-AP STA. According to the present embodiment, the AP may be a legacy AP not supporting the QoS, but is not limited to the legacy AP. The AP may be called a convergence controller, a base station (BS), a node-B, or a site controller.

FIG. 1 is a diagram illustrating a format of a MAC frame (hereinafter, referred to as a "TDLS frame") which a QSTA to set up a direct link or to have set up the direct link in a TDLS wireless network transmits and receives to and from an opposite QSTA (or a peer QSTA) through an AP. Referring to FIG. 1, the TDLS frame includes a MAC header field, a logical link control (LLC)/sub-network access protocol (SNAP) field, a remote frame type field, a TDLS packet type field, an information field, and an error correction (Cyclic Redundancy code: CRC) field. The TDLS frame may further include a protocol version field.

The MAC header field includes information common to almost all the types of frames. For example, the MAC header field includes a frame control field, a duration/ID field, plural address fields (Address1, Address2, Address3, and Address4), a sequence control field, and/or a QoS control field.

The frame control field includes a protocol version field, a type and subtype field for identifying a function of the frame, a more fragment field indicating whether a more fragment subsequent to a current MSDU or MMPDU exists, a retry field indicating that the frame is a frame to be re-transmitted, and a power management field indicating a power save mode. The power management field of the frame control field indicates a mode where the STA operates after it successfully completes the exchange of a series of frames. For example, when the power management field is set to "0", it indicates that the STA transmitting the frame operates in an active mode. However, when the power management field is set to "1", it indicates that the transmitting STA operates in a peer power save mode.

The QoS control field is used to identify various QoS-related information that varies depending on a traffic category (TC) or a traffic stream (TS) to which the frame belongs and a frame type and subtype. The QoS control field can exist in all the TDLS frames in which a QoS subfield of a subtype field of the frame is set to "1." The respective QoS control field includes five subfields and usage and various possible layouts of the subfields are shown in Table 1.

TABLE 1

| Applicable Frame (sub) Types | Bits 0-3 | Bit 4 | Bits 5-6 | Bit 7 | Bits 8-15 |
|---|---|---|---|---|---|
| QoS (+)CF-Poll frames sent by HC | TID | EOSP | Ack Policy | Reserved | TXOP limit |
| QoS Data, QoS Null, and QoS Data + CF-Ack frames sent by HC | TID | EOSP | Ack Policy | Reserved | AP PS Buffer State |
| QoS data frames sent by non-AP to an AP | TID | 0 | Ack Policy | Reserved | TXOP Duration Requested |
|  | TID | 1 | Ack Policy | Reserved | Queue Size |
| QoS Data, QoS Null, and QoS Data + CF-Ack frames sent over the direct link | TID | EOSP | Ack Policy | Reserved | Reserved |

Referring to FIG. 1, the LLC/SNAP field includes an LLC/SNAP header. The remote frame type field is set to a value (for example, "2") indicating the TDLS frame. The protocol version field is set to a value indicating a protocol version of a transmitted/received message.

The TDLS packet type field is set to a value specifying a type of the TDLS frame. Examples of the types of the TDLS frame and the corresponding values are shown in FIG. 2. Referring to FIG. 2, the TDLS frame includes a TDLS setup request frame, a TDLS setup response frame, a TDLS setup confirm frame, a TDLS teardown request frame, and a TDLS teardown response frame.

The information field of the TDLS frame includes a variety of information individually specified depending on the types of the TDLS frames. The included information varies depending on the TDLS types. The error correction field (CFC) includes additional information for correcting an error of the frame.

A direct link setup procedure in a TDLS wireless network according to an embodiment of the invention will be described now.

It can be considered that the direct link setup procedure in the QBSS is similarly employed as the direct link setup procedure in the TDLS wireless network. According to the direct link setup procedure in the QBSS, the direct link setup procedure is completed by a two-way handshake between two QSTAs.

Figure 3:
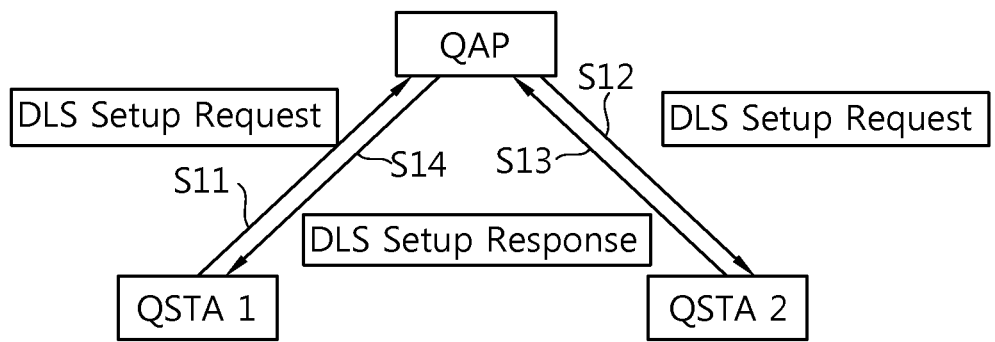
FIG. 3 is a diagram illustrating a flow of messages in a direct link setup procedure in a QBSS.

FIG. 3 is a diagram illustrating a flow of messages in the direct link setup procedure in the QBSS. Referring to FIG. 3, first, a first QSTA (QSTA1) intending to set up a direct link transmits to a QAP a direct link setup request message for a second QSTA (QSTA2) (S11). The QAP having confirmed that the received message is the direct link setup request message transmits the direct link setup request message from the first QSTA to the second QSTA (S12). The second QSTA transmits a message in response to the received direct link setup request message, for example, a direct link setup response message, to the QAP (S13). The QAP having confirmed that the received message is a response message responsive to the request message in step S11 transmits the direct link setup response message from the second QSTA to the first QSTA (S14).

According to the direct link setup procedure in FIG. 3, the QAP directly participates therein and relays the exchange of the direct link setup request and response messages between the first QSTA and the second QSTA, thereby completing the direct link setup procedure. In the QBSS, the reliability and consistency of the direct link setup procedure can be guaranteed by once exchange of messages. This is because the QAP supporting the DLS procedure can guarantee the exchange of messages for setting up a direct link between the first QSTA and the second QSTA, the QAP can notify the first QSTA and/or the second QSTA of a fact that the exchange of messages fails, or the QAP can initiatively end the direct link setup procedure.

More specifically, in the direct link setup procedure in the QBSS, the QAP-initiated operation is possible when there is a problem in the direct link setup procedure (S11 to S14) shown in FIG. 3. For example, when the transmission in step S12 fails, the QAP can transmit a direct link setup request message to the second QSTA again or can otherwise transmit a direct link teardown request message to the first QSTA. Alternatively, when the transmission in step S13 fails, the QAP can transmit a direct link teardown request message to the first QSTA and the second QSTA. Alternatively, when the transmission in step S14 fails, the QAP can transmit the direct link setup response message from the second QSTA again.

Accordingly, in the QBSS, the reliable direct link setup procedure can be performed between the first QSTA and the second QSTA only by the exchange of the direct link setup request message and the direct link setup response message (that is, the two-way handshake) between the first QSTA and the second QSTA.

Figure 4:
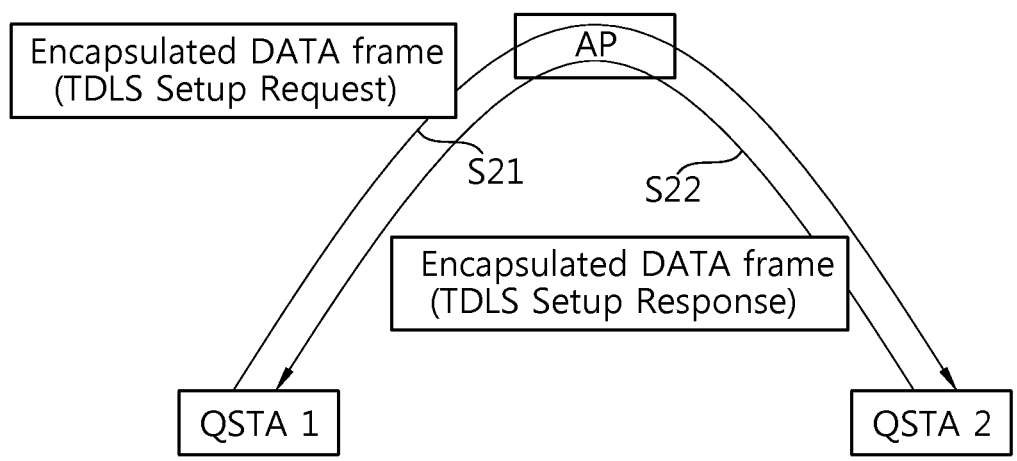
FIG. 4 is a diagram illustrating a flow of messages in a direct link setup procedure when the direct link setup procedure shown in FIG. 3 is applied to a TDLS wireless network without any change.

FIG. 4 is a diagram illustrating a flow of messages in the direct link setup procedure when the direct link setup procedure (that is, the two-way handshake procedure) shown in FIG. 3 is applied to the TDLS wireless network. The TDLS wireless network system includes at least two non-AP QSTAs (QSTA1 and QSTA2) and a legacy AP not supporting the DLS procedure. For the purpose of convenient explanation in the following description, the non-AP QSTA initiating the direct link setup procedure, that is, transmitting the TDLS setup request frame, is called an initiating QSTA or a TDLS initiator and the non-AP QSTA related to the direct link setup procedure with the TDLS initiator or setting up a direct link thereto is called a peer QSTA.

Referring to FIG. 4, the first QSTA (QSTA1) as the TDLS initiator intending to set up a direct link to the second QSTA2 as the peer STA transmits to the second QSTA a request message for requesting for setting up a direct link (S21). The request message may be a TDLS setup request frame. The AP merely relays the request message received from the first QSTA to the second QSTA. The second QSTA having received the TDLS setup request frame transmits a response message to the first QSTA in response to the TDLS setup request frame (S22). The response message may be a TDLS setup response frame. In this case, the AP merely relays the response message received from the second QSTA to the first QSTA.

In the direct link setup procedure in the TDLS wireless network, an AP-initiated operation is not possible. That is, even when the transmission (including the relay in the AP) in step S21 and/or step S22 fails, the AP cannot initiatively transmit the failed frame again or the direct link teardown request frame to the non-AP QSTA.

In the direct link setup procedure shown in FIG. 4, when the response message transmitted in step S22 is not successfully relayed from the AP to the first QSTA, a difference may occur in recognition of the first QSTA and the second QSTA on the completion of the direct link setup procedure. More specifically, the first QSTA not having received the response message may recognize that the direct link is not successfully set up but the second QSTA having transmitted the response message may recognize that the direct link is successfully set up. As a result, in the two-way handshake direct link setup procedure shown in FIG. 4, it is difficult to guarantee the reliability of the procedure when it is applied to the TDLS wireless network.

In order to solve this problem that can occur in the two-way handshake direct link setup procedure, an embodiment employs a three-way handshake direct link setup procedure. More specifically, in addition to the above-mentioned two-way handshake direct link setup procedure, a process of allowing the TDLS initiator to transmit to the peer STA a confirm message indicating that the TDLS setup response frame is successfully received, for example, a TDLS setup confirm frame, is further performed. This will be described now in detail.

Figure 5:
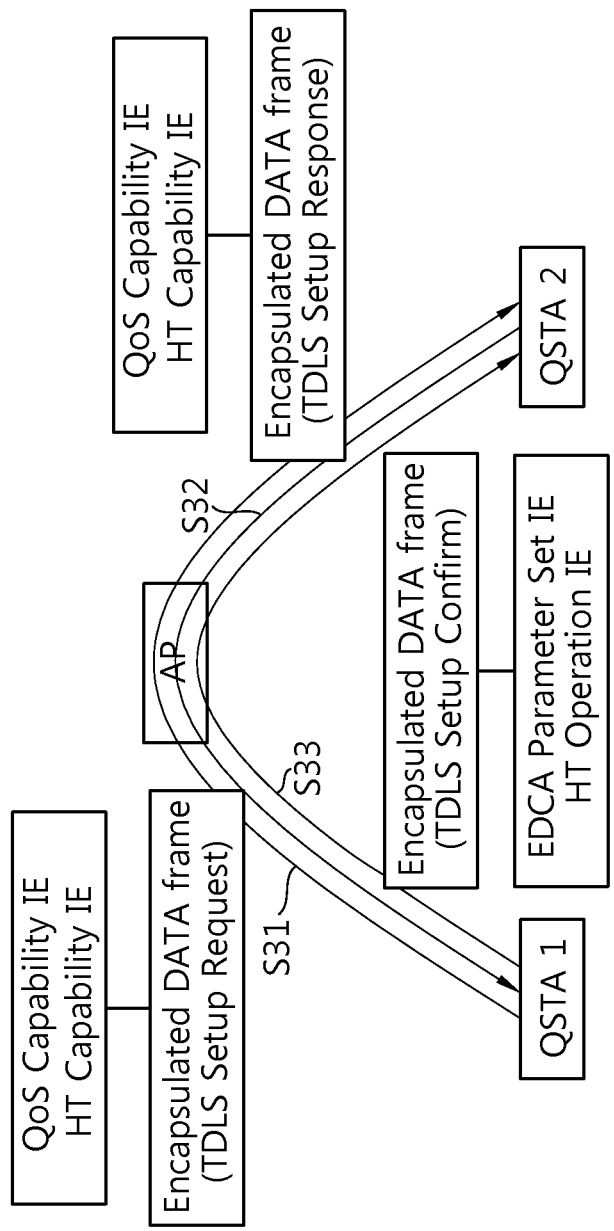
FIG. 5 is a diagram illustrating a flow of messages in a direct link setup procedure in a TDLS wireless network according.

FIG. 5 is a diagram illustrating a flow of messages in a direct link setup procedure in the TDLS wireless network. The TDLS wireless network system includes at least two non-AP QSTAs (hereinafter, simply referred to as "QSTA") and a legacy AP not supporting the QoS.

Referring to FIG. 5, the first QSTA (QSTA1), that is, the TDLS initiator, intending to set up a direct link to the second QSTA (QSTA2) as the peer STA transmits a request message for requesting for setting up a direct link, for example, a TDLS setup request frame, to the second QSTA through the AP (S41). In this step, the AP merely relays the TDLS setup request frame. The TDLS setup request frame may be a frame in which the TDLS packet type field of the TDLS frame shown in FIG. 1 is set to a value indicating the TDLS setup request. Accordingly, in step S41, the TDLS setup request is encapsulated in the form of a data frame and is then transmitted to the second QSTA through the AP.

FIG. 6 shows information included in the information field of the TDLS setup request frame (in the information field of the TDLS frame shown in FIG. 1). Referring to FIG. 6, the information field of the TDLS setup request frame includes link ID information, an association request frame body, and dialog token information. Although not shown in FIG. 6, the information field of the TDLS setup request frame may further include capability information or extended capability information.

The capability information included in the TDLS setup request frame comprises QoS capability information and/or HT (High Throughput) capability information. If the first QSTA (QTSA1) supports QoS feature, it includes QoS Capability to the TDLS setup request frame. And, if the first QSTA (QTSA1) supports HT feature, it includes HT Capability to the TDLS setup request frame.

According to an aspect of this embodiment, the link ID information may include BSSID and/or SSID. In the TDLS wireless network, some APs can support plural BSSID and plural SSID. In this case, in order to set up a direct link between the non-AP QSTAs associated with the AP, a specific BSSID and a specific SSID in which the direct link is set up need to be specified in messages (such as a TDLS setup request frame, a TDLS setup response frame, and/or a TDLS setup confirm frame) to be exchanged in the direct link setup procedure.

FIG. 7 is a diagram illustrating a format of the link ID field included in the TDLS setup request frame. Referring to FIG. 7, the link ID field further includes a BSSID subfield and an SSID subfield, in addition to a transmitter address subfield, a receiver address subfield, and a DLS timeout subfield.

Transmitter address field includes the address of the first QSTA that transmitted TDLS setup request frame. And the receiver address field includes the address of the second QSTA that transmitted TDLS setup request frame.

The format of the link ID field may be also included in the TDLS setup response frame. In this case, the transmitter address includes the address of the second QSTA that transmitted TDLS setup response frame, and the receiver address field includes the address of the first QSTA that receives the TDLS setup response frame.

As described above, QSTAs can be associated with multiple APs and an APs can support multiple QSTAs. And plural sevice provider can share the APs, and some APs can be used by plural service provider. Therefore, the service providers of the QSTAs associated with same AP can be different from the peer QSTA's service provider.

The BSSID field contains information about AP involved with the QSTA. Cheking the BSSID field, QSTA can distinguish if the peer QSTA is associated with the same AP with which the QSTA is associated.

And the SSID field contains information about the service provider that serves the QSTA. Therefore, cheking the BSSID field, QSTA can distinguish if the peer QSTA is served by the same service provider by which the QSTA is served.

Referring to FIG. 5 again, the second QSTA having received the TDLS setup request frame transmits a response message responsive to the TDLS setup request frame, for example, the TDLS setup response message, to the first QSTA through the AP (S42). In this step, the AP merely relays the TDLS setup response frame. In this case, the TDLS setup response frame may be a frame in which the TDLS packet type field of the TDLS frame shown in FIG. 1 is set to a value indicating the TDLS setup response. Accordingly, the TDLS setup response frame is encapsulated in the form of a data frame and is then transmitted to the first QSTA through the AP.

FIG. 8 shows information included in the information field of the TDLS setup response frame (in the information field of the TDLS frame shown in FIG. 1). Referring to FIG. 8, the information field of the TDLS setup response frame includes link ID information, status code information, association request frame body, and dialog token information. In this case, the link ID information may have the format shown in FIG. 7, which is only exemplary. Similarly to the information field of the TDLS setup response frame, the information field of the TDLS setup response frame may further include a capability information element and an extended capability information element, indicating whether the STA transmitting the TDLS setup response frame supports a peer PSM AP mode and/or a peer PSM client mode.

The capability information included in the TDLS setup response frame comprises QoS capability information and/or HT (High Throughput) capability information. If the second QSTA (QTSA2) supports QoS feature, it includes QoS Capability to the TDLS setup response frame. And, if the second QSTA (QTSA2) supports HT feature, it includes HT Capability to the TDLS setup response frame.

Referring to FIG. 5 again, the first QSTA transmits a confirm message, for example, a TDLS setup confirm frame, responsive to the received TDLS setup response frame to the second QSTA through the AP (S43). In this step, the AP merely relays the TDLS setup confirm frame. The TDLS setup confirm frame may be a frame in which the TDLS packet type field of the TDLS frame shown in FIG. 1 is set to a value indicating the TDLS setup confirm. The TDLS setup confirm frame is encapsulated in the form of a data frame and is then transmitted to the second QSTA through the AP.

According to this embodiment of the present invention, the direct link setup procedure is completed after the first QSTA having requested for setting up a direct link transmits the confirm message responsive to the response message received from the second QSTA to the second QSTA. Accordingly, even when the management action frame (for example, the TDLS setup response frame) encapsulated and transmitted in the form of a data frame, it is possible to prevent a difference in recognition between the first QSTA and the second QSTA regarding the completion of the direct link setup procedure.

According to an aspect of this embodiment, the confirm message transmitted in step S43 can include information necessary for allowing the non-AP QSTA to properly perform the QoS facilities and/or HT facilities even though the AP does not support QoS features. The information necessary for the proper QoS facility operation may be, for example, EDCA (Enhanced Distributed Channel Access) parameter set information element. In this case, the EDCA parameter set information element includes a QoS parameter used in a primary channel and/or an secondary channel. The response frame (for example, the TDLS setup response frame) transmitted in step S42 may include information necessary for allowing the non-AP QSTA to properly perform the QoS facility operation as needed.

Figure 9:
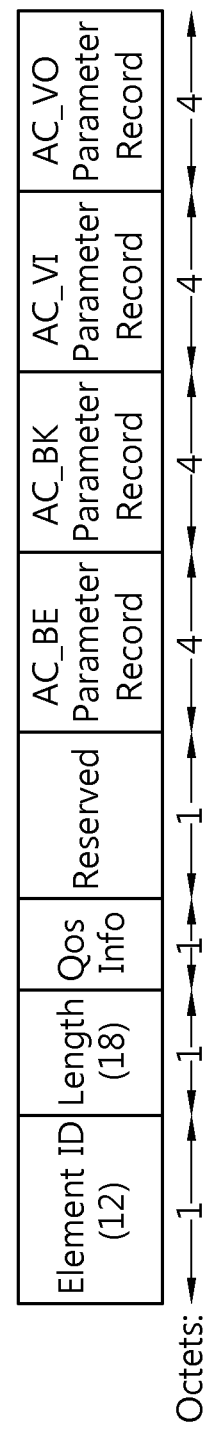
FIG. 9 is a diagram illustrating a format of an EDCA parameter set information element.

FIG. 9 is a diagram illustrating a format of the EDCA parameter set information element. Referring to FIG. 9, the EDCA parameter set information element includes an element ID field, a length field, a QoS information field, and parameter record fields by access categories (AC_BE Parameter Record, AC_BK Parameter Record, AC_VI Parameter Record, and AC_VO Parameter Record). The element ID field is set to a value indicating that the corresponding element is the EDCA parameter set information element. The length field is set to a value indicating the length of the corresponding element. The QoS information field includes plural bit fields indicating the QoS facility information of the transmitting STA.

Figure 10:
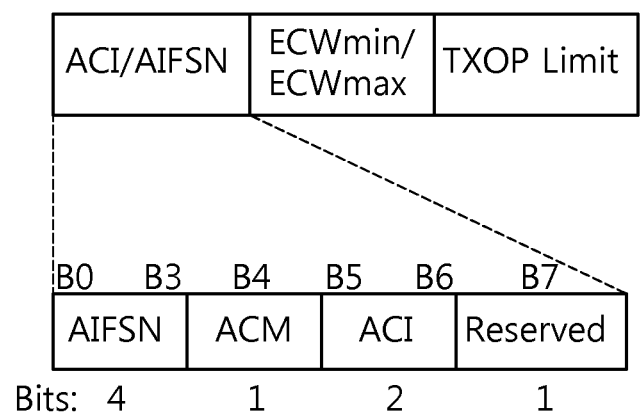
FIG. 10 is a diagram illustrating a format of a parameter record field.

The formats of the parameter record fields by access categories may be equal to each other and an example thereof is shown in FIG. 10. Referring to FIG. 10, the AC_BE Parameter Record field, the AC_BK Parameter Record field, the AC_VI Parameter Record field, or the AC_VO Parameter Record field includes an ACI/AIFSN (Access Category Index/Arbitration InterFrame Space Number) subfield, an ECWmin/ECWmax subfield, and a TXOP limit subfield. The ACI/AIFSN subfield includes an AIFSN bit field, an ACM (Admission Control Mandatory) bit field, and an ACI bit field. according to this embodiment, the ACM bit field can be set to "0", which means that no admission control is included in the corresponding access category.

According to this embodiment, the first QSTA can notify the second QSTA as the peer STA of the QoS parameter using the EDCA parameter set information element. Accordingly, when the first QSTA and the second QSTA exchange data through the setup direct link, it is possible to make communication supporting the QoS with reference to the QoS parameter.

According to another aspect of this embodiment, the confirm frame transmitted in step S43 may additionally include information necessary for efficiently using plural sub channels. The information necessary for efficiently using the plural (for example, two) sub channels may be HT operation information element defined in the standard of IEEE 802.11n. HT operation information element includes the parameters (e.g., secondary channel offset parameter) for enabling HT capability of Non-AP QSTA even though AP does not support HT features. However, the embodiment of the invention is not limited to two sub channels, but may be similarly applied to a WLAN system employing three or more sub channels. In this case, the response frame (for example, the TDLS setup response frame) transmitted in step S42 may include the information necessary for efficiently using the plural sub channels.

According to this embodiment, the non-AP QSTA intending to set up a direct link can provide the information on the secondary sub channels to the peer non-AP QSTA, in addition to the primary sub channel. Accordingly, the non-AP QSTA having set up the direct link in the TDLS wireless network can use the primary sub-channel and the second sub-channel in the communication through the direct link, or can use only the secondary sub-channel, thereby enhancing the efficiency for using radio resources.

Figure 11:
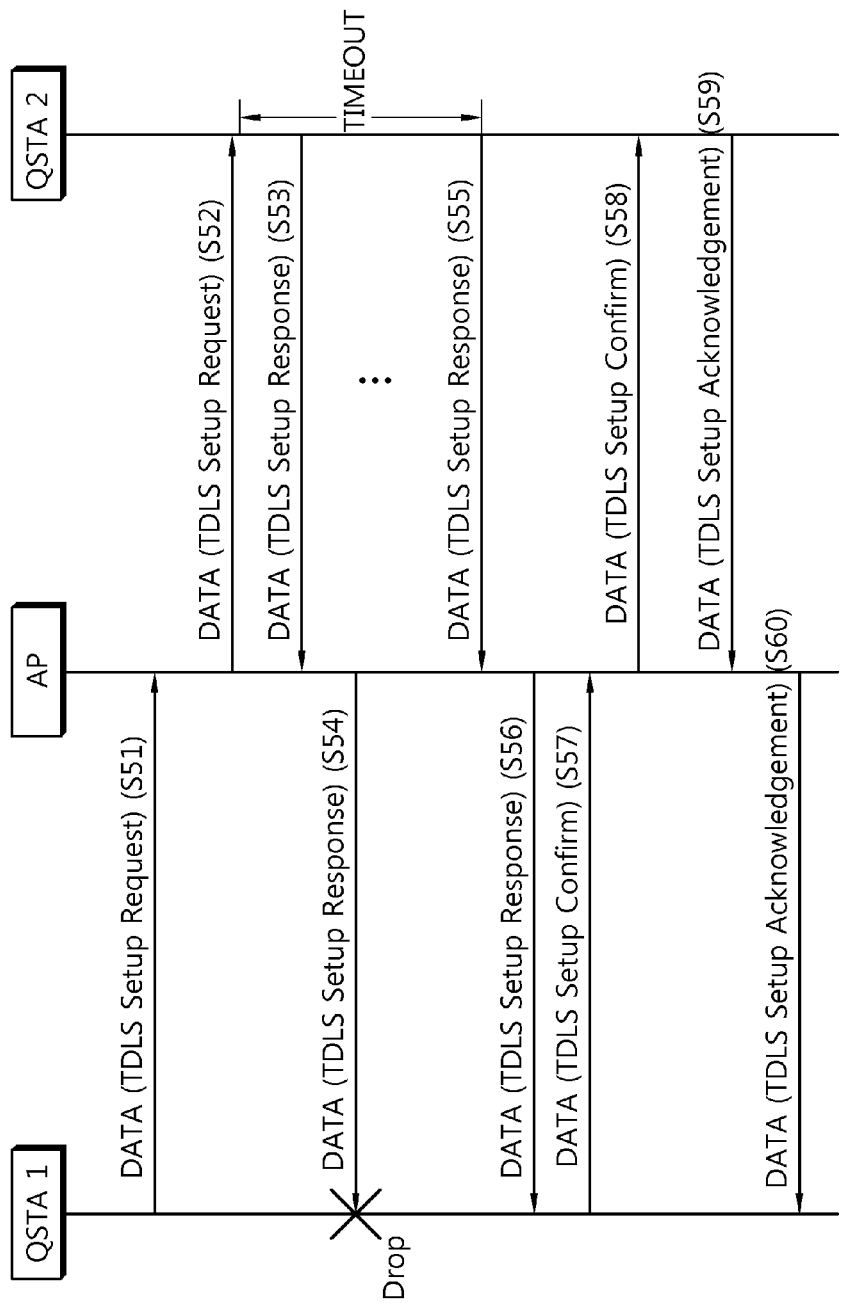
FIG. 11 is a timing diagram illustrating the direct link setup procedure according to an embodiment of the invention.

FIG. 11 is a timing diagram illustrating the direct link setup procedure. Referring to FIG. 11, the first QSTA transmits the TDLS setup request frame encapsulated in the form of a data frame to the AP (S51). The AP transmits the received TDLS setup request frame to the second QSTA (S52). Steps S51 and S52 correspond to step S41 of FIG. 5.

When the second QSTA transmits the TDLS setup response frame encapsulated in the form of a data frame to the AP (S53), the AP tries to transmit the received TDLS setup response frame to the first QSTA (S54). However, in the example shown in FIG. 11, the TDLS setup response frame to be transmitted by the AP in step S54 is not successfully transmitted to the first QSTA. In this case, according to the embodiment of two-way handshake procedure, the second QSTA not receiving the confirm frame, for example, the TDLS setup confirm frame, from the first QSTA for a predetermined time recognizes that the direct link setup procedure is not successfully completed. In this case, the second QSTA determines that the TDLS setup response frame transmitted therefrom is not successfully transmitted to the first QSTA and then may transmit the TDLS setup response frame to the AP again (S55). The re-transmission of the TDLS setup response frame may be repeatedly performed when the second QSTA does not receive the TDLS setup confirm frame for a predetermined time (for example, the period of time represented by "TIMEOUT" in FIG. 10). The AP transmits the re-transmitted TDLS setup response frame to the first QSTA again (S56). Steps S53 to S56 correspond to step S42 in FIG. 5.

When the second QSTA transmits the TDLS setup response frame encapsulated in the form of a data frame to the AP (S53), the AP tries to transmit the received TDLS setup response frame to the first QSTA (S54). However, in the example shown in FIG. 11, the TDLS setup response frame to be transmitted by the AP in step S54 is not successfully transmitted to the first QSTA. In this case, according to the embodiment of two-way handshake procedure, the second QSTA not receiving the confirm frame, for example, the TDLS setup confirm frame, from the first QSTA for a predetermined time recognizes that the direct link setup procedure is not successfully completed. In this case, the second QSTA determines that the TDLS setup response frame transmitted therefrom is not successfully transmitted to the first QSTA and then may transmit the TDLS setup response frame to the AP again (S55). The re-transmission of the TDLS setup response frame may be repeatedly performed when the second QSTA does not receive the TDLS setup confirm frame for a predetermined time (for example, the period of time represented by "TIMEOUT" in FIG. 10). The AP transmits the re-transmitted TDLS setup response frame to the first QSTA again (S56). Steps S53 to S56 correspond to step S42 in FIG. 5.

The first QSTA having received the TDLS setup response frame transmits the confirm frame, for example, the TDLS setup confirm frame, to the AP (S57). Then, the AP transmits the received TDLS setup confirm frame to the second QSTA (S58). Steps S57 and S58 correspond to step S43 in FIG. 5. The direct link setup procedure in the TDLS wireless network is ended with the successful transmission of the TDLS setup confirm frame. As described above, according to this embodiment, the TDLS setup confirm frame further includes the EDCA parameter set information element and may further include the HT operation information element (e.g., secondary channel offset element).

In addition to the above-mentioned direct link setup procedure, a process of allowing the TDLS initiator to receive from the peer STA a acknowledgement message indicating that the TDLS setup confirm frame is successfully received, for example, a TDLS setup acknowledgement frame, is further performed.

The second QSTA having received the TDLS setup confirm frame transmits an acknowledgement message, for example, the TDLS setup acknowledgement frame, to the AP. Then, the AP transmits the TDLS setup acknowledgement frame to the first QSTA. The AP merely relays the request message received from the first QSTA to the second QSTA.

In this embodiment, by additionally performing the process of step S59 and S60 in addition to the embodiment described in the explanation of the FIG. 5 to set up the direct link, it is possible to further enhance the reliability of the direct link setup procedure.

In this embodiment referring to FIG. 11 the second QSTA transmits the TDLS setup acknowledgement frame to the first QSTA via AP. However, in another embodiment, the TDLS setup acknowledgement frame may be transmitted to the first QSTA through the direct link, not passing by the AP.

According to above-described embodiments of the present invention, it is possible to enhance the reliability of the direct link setup procedure in a TDLS wireless network. At least, QSTA or AP may notice whether the confirm message has been lost or not as soon as possible. In addition, it is possible to prevent a difference between recognitions of two non-AP QSTAs regarding the completion of the direct link setup procedure, thereby guaranteeing consistency in completion of the procedure between the two non-AP-QSTAs.

Figure 12:
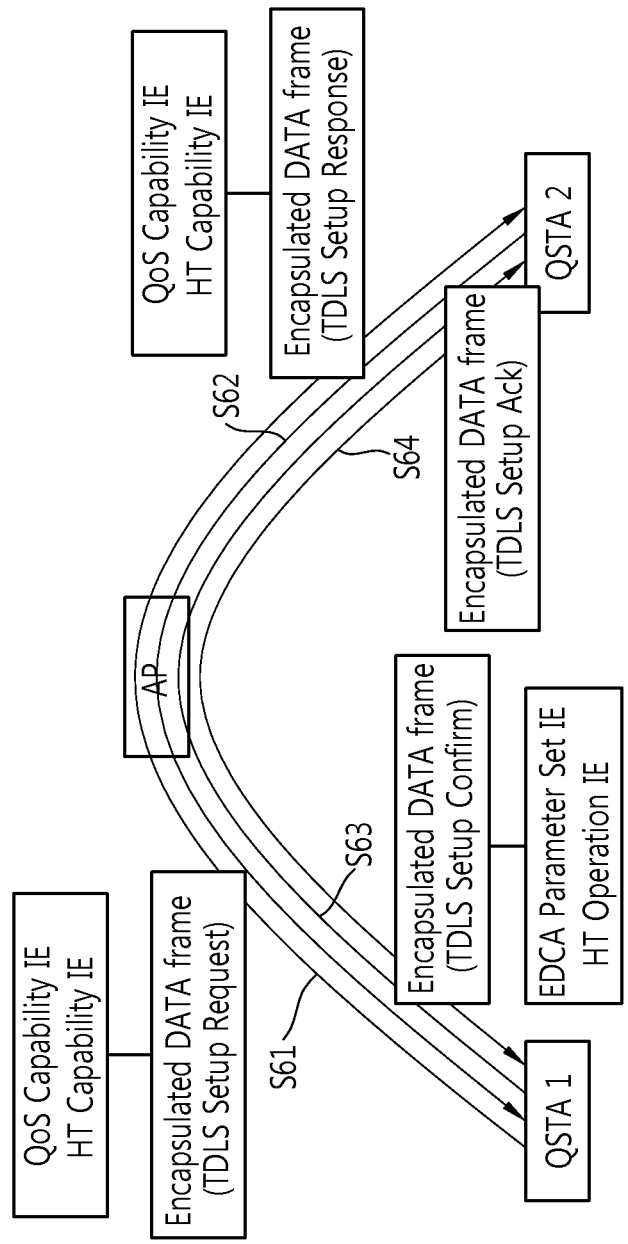
FIG. 12 is a diagram illustrating a flow of messages in a direct link setup procedure in a TDLS wireless network shown in FIG. 11.

FIG. 12 is a diagram illustrating a flow of messages in a direct link setup procedure in the TDLS wireless network shown in FIG. 11. This embodiment is different from the embodiment of the two or three-way handshake procedure, in that a four-way handshake procedure further including a step of allowing the second QSTA to transmit an acknowledgement message, for example, a TDLS setup acknowledgement frame, to the first QSTA in addition to the three-way handshake procedure. The embodiment of the four-way handshake procedure centered on the differences from the embodiment of the two or three-way handshake procedure will be described now.

Referring to FIG. 12, the first QSTA intending to set up a direct link to the second QSTA transmits a message for requesting for setting up the direct link, for example, the TDLS setup request frame, to the second QSTA through the AP (S61). The second QSTA having received the TDLS setup request frame transmits the TDLS setup response frame to the first QSTA through the AP in response to the TDLS setup request frame (S62). The first QSTA transmits a confirm message responsive to the received TDLS setup response frame, for example, the TDLS setup confirm frame, to the second QSTA through the AP (S63). The second QSTA transmits an acknowledgement message, for example, the TDLS setup acknowledgement frame, to the first QSTA through the AP in response to the received TDLS setup confirm frame (S64). In this embodiment, by additionally performing the process of step S64 in addition to the embodiments of the two or three-way handshake procedure to set up the direct link, it is possible to further enhance the reliability of the direct link setup procedure.

In this embodiment, the second transmits the TDLS setup acknowledgement frame to the AP and the AP transmits the TDLS setup acknowledgement frame to the first QSTA.

And the first QSTA and the second QSTA can directly communicate with each other through the direct link, as described above. Therefore in another embodiment, the second QSTA may transmit the TDLS setup acknowledgement frame to the first QSTA through the direct link.

According to above-described embodiments of the present invention, it is possible to enhance the reliability of the direct link setup procedure in a TDLS wireless network. Particularly, it is possible to prevent a difference between recognitions of two non-AP QSTAs regarding the completion of the direct link setup procedure, thereby guaranteeing consistency in completion of the procedure between the two non-AP-QSTAs.

In addition, according to other embodiment of the present invention, it is possible for the QoS capabilities and/or the HT capabilities of the non-AP QSTAs having established the direct link therebetween in TDLS wireless network to properly operate in a communication between the non-AP QSTAs.

The methods as described above can be performed by processors such as a microprocessor, a controller, a microcontroller, an application specific integrated circuit (ASIC), and the like, according to software coded to perform such methods or program codes, or by a processor of a user equipment (UE). Designing, developing, and implementing such codes will be obvious to the skilled person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A Tunneled Direct Link Setup (TDLS) establishment method for a TDLS initiator, the method comprising:
   associating a Basic Service Set (BSS) which includes an Access Point (AP);
   transmitting a TDLS setup request frame through the AP to an intended peer station, the TDLS setup request frame requesting to establish a TDLS direct link between the TDLS initiator and the intended peer station, the TDLS setup request frame including a link identifier identifying the TDLS direct link, the link identifier including a BSSID field, a transmitter address field and a receiver address field, the BSSID field being set to a BSSID of a BSS to which the TDLS initiator is associated, the transmitter address field being set to a medium access control (MAC) address of the TDLS initiator, the receiver address field being set to a MAC address of the intended peer station;
   receiving a TDLS setup response frame including a status code field through the AP from the intended peer station in response to the TDLS setup request frame, the status code field indicating whether or not the request by the TDLS setup request frame is accepted; and transmitting a TDLS setup confirm frame including the link identifier through the AP to the intended peer station in response to the TDLS setup response frame, wherein the TDLS setup confirm frame includes high throughput operation information, the high throughput operation information including information to utilize a plurality of subchannels in the BSS, wherein the TDLS setup confirm frame includes an Enhance Distributed Channel Access (EDCA) parameter set information element, and wherein both the TDLS setup request frame and the TDLS setup response frame include a QoS capability information element.

2. The TDLS establishment method of claim 1, wherein each of the TDLS setup request frame and the TDLS setup response frame include a High Throughput (HT) capability information element.

3. The TDLS establishment method of claim 1, wherein the BSSID of the BSS to which the TDLS initiator is associated is set to a MAC address of the AP.

4. The TDLS establishment method of claim 3, wherein the BSS to which the TDLS initiator is associated is identical to an infrastructure BSS to which the intended peer station is associated.

5. A station for supporting Tunneled Direct Link Setup (TDLS) in a wireless local access network, the station comprising:

a processor configured to generate and process frames; and
a transceiver operably connected to the processor and configured to transmit and receive the frames for the processor,
wherein the station is configured to:
associate a Basic Service Set (BSS) which includes an Access Point (AP),
transmit a TDLS setup request frame through the AP to an intended peer station, the TDLS setup request frame requesting to establish a TDLS direct link between the station and the intended peer station, the TDLS setup request frame including a link identifier identifying the TDLS direct link, the link identifier including a BSSID field, a transmitter address field and a receiver address field, the BSSID field being set to a BSSID of a BSS to which the station is associated, the transmitter address field being set to a medium access control (MAC) address of the station, the receiver address field being set to a MAC address of the intended peer station, receive a TDLS setup response frame including a status code field through the AP from the intended peer station in response to the TDLS setup request frame, the status code field indicating whether or not the request by the TDLS setup request frame is accepted, and transmit a TDLS setup confirm frame including the link identifier through the AP to the intended peer station in response to the TDLS setup response frame, wherein the TDLS setup confirm frame includes high throughput operation information, the high throughput operation information including information to utilize a plurality of subchannels in the BSS, wherein the TDLS setup confirm frame includes an Enhanced Distributed Channel Access (EDCA) parameter set information element, and wherein both the TDLS setup request frame and the TDLS setup response frame include QoS capability information element.

6. The station of claim 5, wherein each of the TDLS setup request frame and the TDLS setup response frame include a High Throughput (HT) capability information element.

7. The station of claim 5, wherein the BSSID of the BSS to which the TDLS initiator is associated is set to a MAC address of the AP.

8. The station of claim 7, wherein the BSS to which the TDLS initiator is associated is identical to an infrastructure BSS to which the intended peer station is associated.

* * * * *